Figure 1:
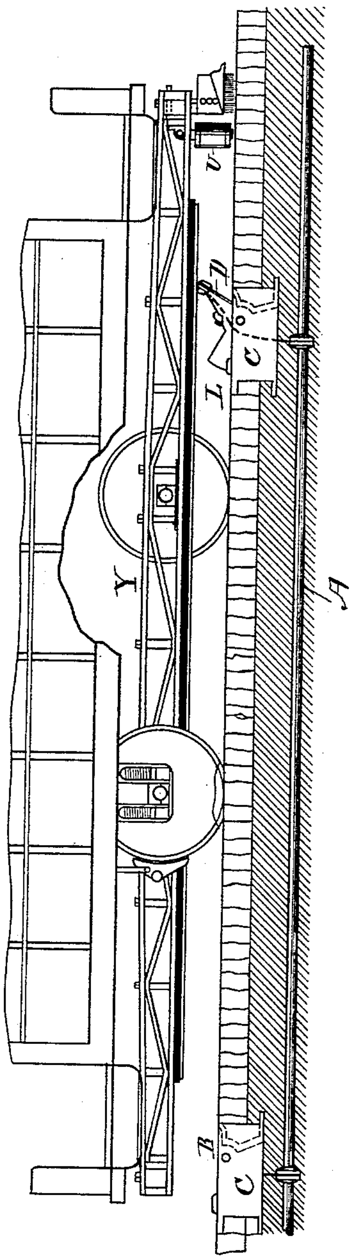

(No Model.)

6 Sheets—Sheet 1.

F. MANSFIELD.

ELECTRIC RAILWAY.

No. 432,673. Patented July 22, 1890.

WITNESSES.

Frank G. Parker

Matthew M. Blunt

INVENTOR.

Frank Mansfield by his attorney

Alex. L. Hayes

THE NORRIS PETERS CO., PHOTO-LITHO., WASHINGTON, D. C.

(No Model.)

6 Sheets—Sheet 2.

F. MANSFIELD.

ELECTRIC RAILWAY.

No. 432,673. Patented July 22, 1890.

WITNESSES.

Frank G. Parker

Matthew M. Blunt

INVENTOR.

Frank Mansfield by his attorney

Alex. L. Hayes

THE NORRIS PETERS CO., PHOTO-LITHO., WASHINGTON, D. C.

(No Model.) 6 Sheets—Sheet 3.

F. MANSFIELD.

ELECTRIC RAILWAY.

No. 432,673. Patented July 22, 1890.

WITNESSES.
Frank G. Parker
Matthew M. Blunt

INVENTOR.
Frank Mansfield
by his attorney
Alex. L. Hayes.

THE NORRIS PETERS CO., PHOTO-LITHO., WASHINGTON, D. C.

(No Model.) 6 Sheets—Sheet 4.

F. MANSFIELD.
ELECTRIC RAILWAY.

No. 432,673. Patented July 22, 1890.

WITNESSES
Frank G. Parker
Matthew M. Blunt.

INVENTOR
Frank Mansfield
by his attorney
Alex. L. Hayes.

THE NORRIS PETERS CO., PHOTO-LITHO., WASHINGTON, D. C.

(No Model.)

6 Sheets—Sheet 5.

F. MANSFIELD.

ELECTRIC RAILWAY.

No. 432,673. Patented July 22, 1890.

WITNESSES.

Frank G. Parker

Matthew M. Blunt

INVENTOR.

Frank Mansfield
by his attorney
Alex. L. Hayes

THE NORRIS PETERS CO., PHOTO-LITHO., WASHINGTON, D. C.

(No Model.)

6 Sheets—Sheet 6.

F. MANSFIELD.

ELECTRIC RAILWAY.

No. 432,673.

Patented July 22, 1890.

WITNESSES.

Frank G. Parker

Matthew M. Blunt

INVENTOR.

Frank Mansfield by his attorney

Alex. L. Hayes

THE NORRIS PETERS CO., PHOTO-LITHO., WASHINGTON, D. C.

UNITED STATES PATENT OFFICE.

FRANK MANSFIELD, OF MELROSE, MASSACHUSETTS.

ELECTRIC RAILWAY.

SPECIFICATION forming part of Letters Patent No. 432,673, dated July 22, 1890.

Application filed March 26, 1887. Renewed June 17, 1889. Serial No. 314,533. (No model.)

*To all whom it may concern:*

Be it known that I, FRANK MANSFIELD, a citizen of the United States, residing at Melrose, in the county of Middlesex and State of Massachusetts, have invented a new and useful Improvement in Devices for Establishing an Electrical Connection Between an Insulated Conductor of Electricity and a Railroad-Car, of which the following is a specification.

In electric railroads as heretofore constructed the current has been supplied to the car by means of a connection with an uninsulated conductor above or at the side of the car or arranged in a conduit below the surface of the road-bed.

There are many places where electric railroads can be advantageously located in which the use of an uninsulated conductor above or at the side of the car would not be desirable, while an open conduit below the surface of the road-bed is objectionable for the reason that it is liable to become filled with water or earth, and therefore partially or completely short-circuit the uninsulated conductor, with a corresponding loss of current. In my system the conductor supplying the current is placed beneath the ground inclosed in a suitable insulating-covering, and connection is automatically established with the car by means of connecting devices, which are brought into operation successively by the car itself as it moves along the track and are arranged at such distances apart according to the length of the car that the car will always be in electrical connection with the conductor by means of one of these connecting devices, while in the other connecting device the circuit will be broken. These connecting devices are also so constructed that the electric connection is made with the car at such a distance from the surface of the ground as to be above the level of any ordinary surface-water, and are also so constructed that when not in operation they are flush with the level of the road-bed and are covered and protected from injury. The conductor is therefore entirely insulated and protected, except at the point where connection is made with the car, and at that point connection is made so far above the surface of the road-bed that the conductor will not be grounded or short-circuited at that point, and, moreover, when the connection between the connector and the car ceases the electrical connection between the contact-piece and the conductor will be broken a sufficient time before the connector returns to its normal position to prevent the possibility of a ground-connection.

My invention therefore consists, as hereinafter more fully set forth, of an insulated conductor placed beneath the track; a series of devices connected with said conductor for establishing a connection above the surface of the ground brought into operation as the car moves along the track, and arranged at such a distance from one another that connection will always be established with the cars; a device on the car for operating these connecting devices, and conducting-strips, with which the connecting devices make contact, arranged under the body of the car and insulated therefrom, and a motor or other device for converting electrical energy into other forms of energy, located on the car and having one terminal connected to the conducting-strip and the other to the wheels of the car.

Figure 2:
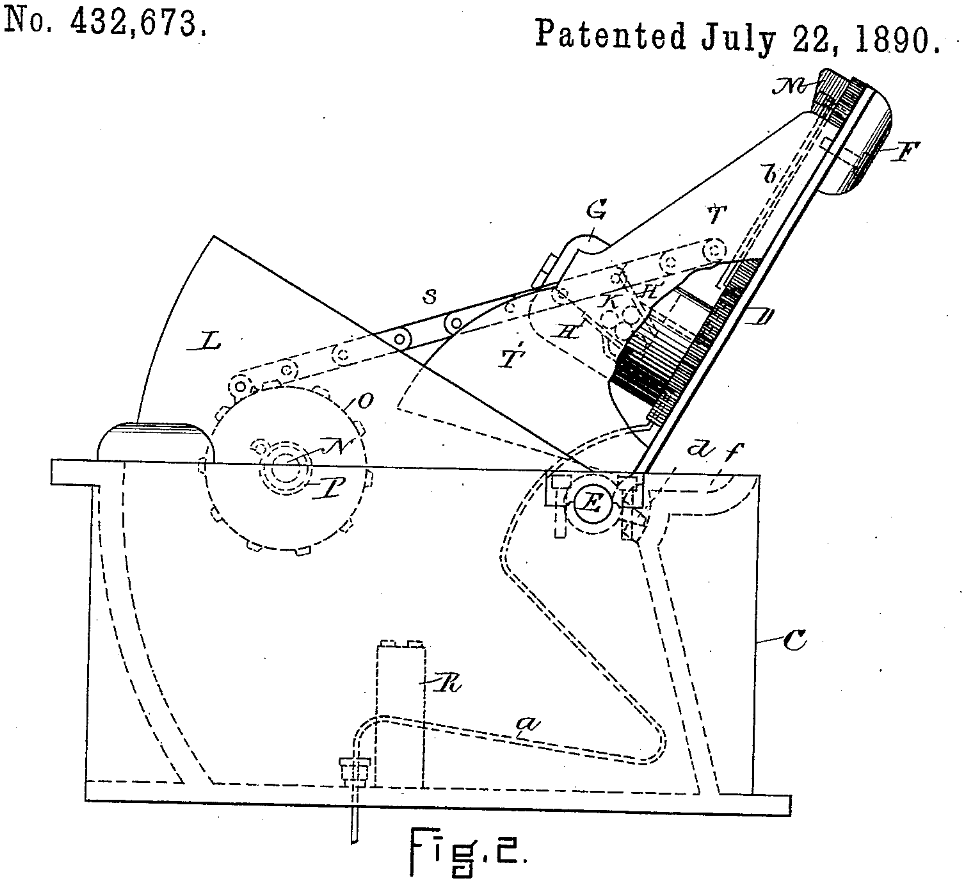
Figure 3:
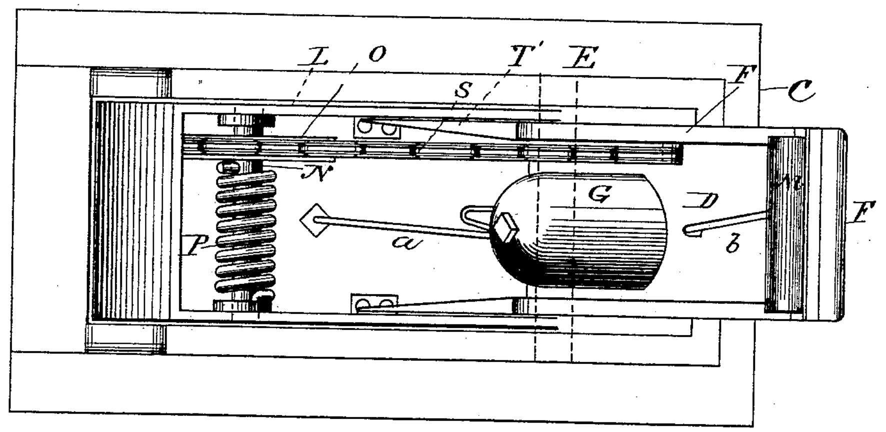
Figure 4:
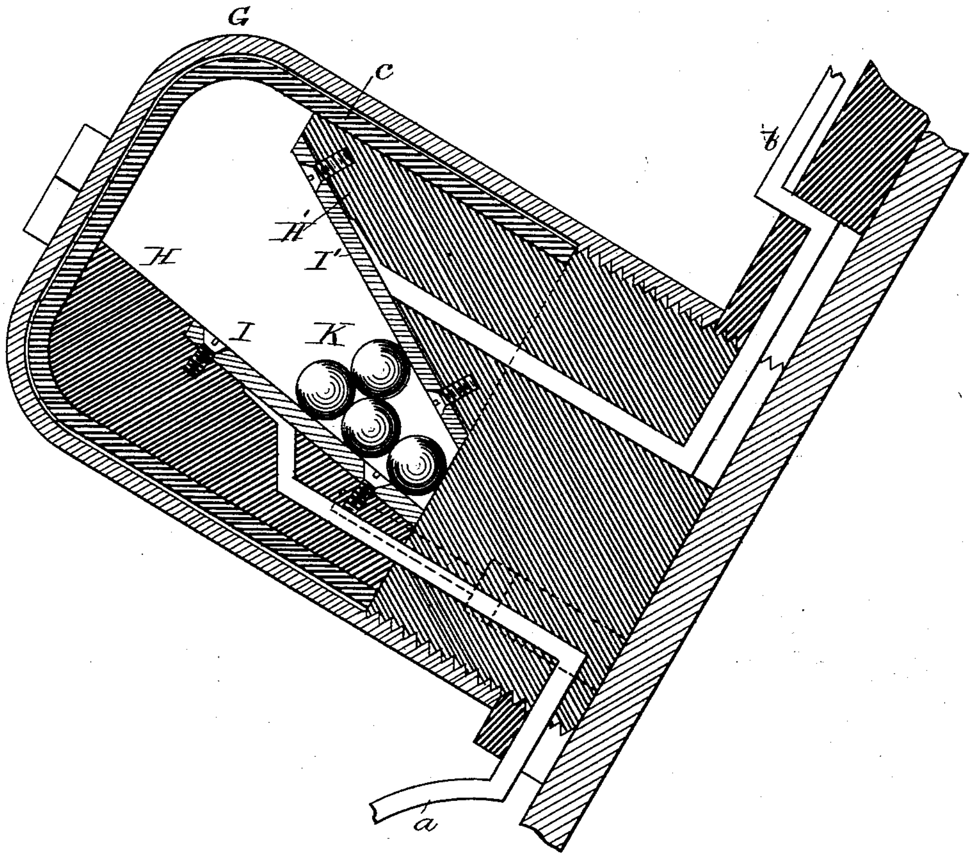
Figure 5:
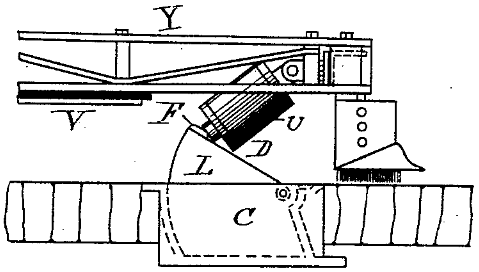
Figure 6:
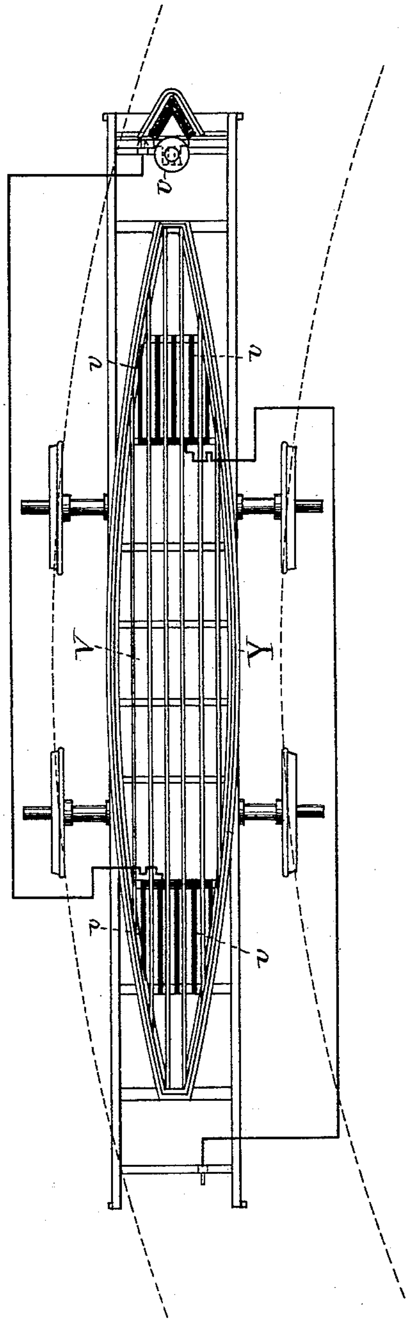
Figure 7:
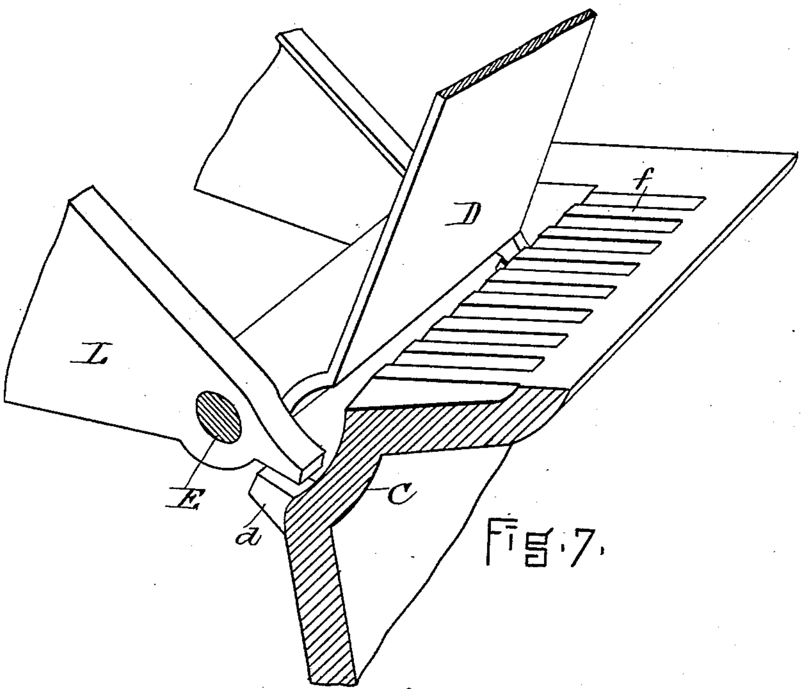
Figure 8:
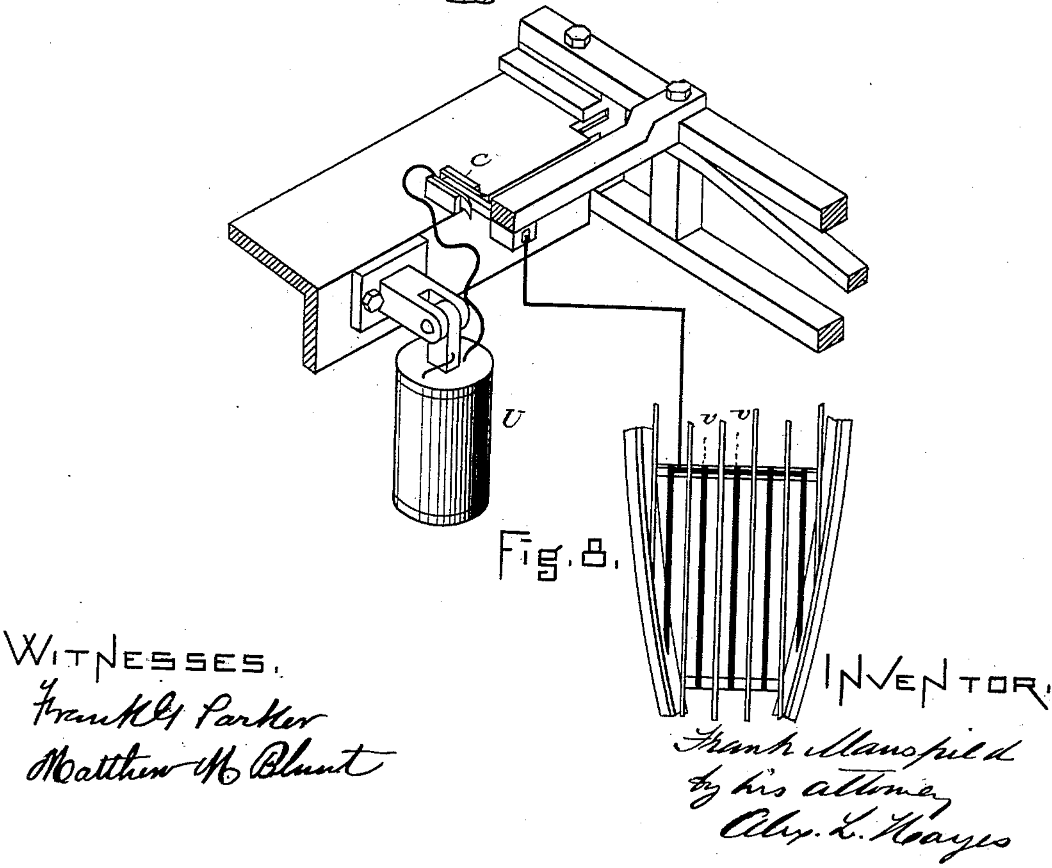
Figure 9:
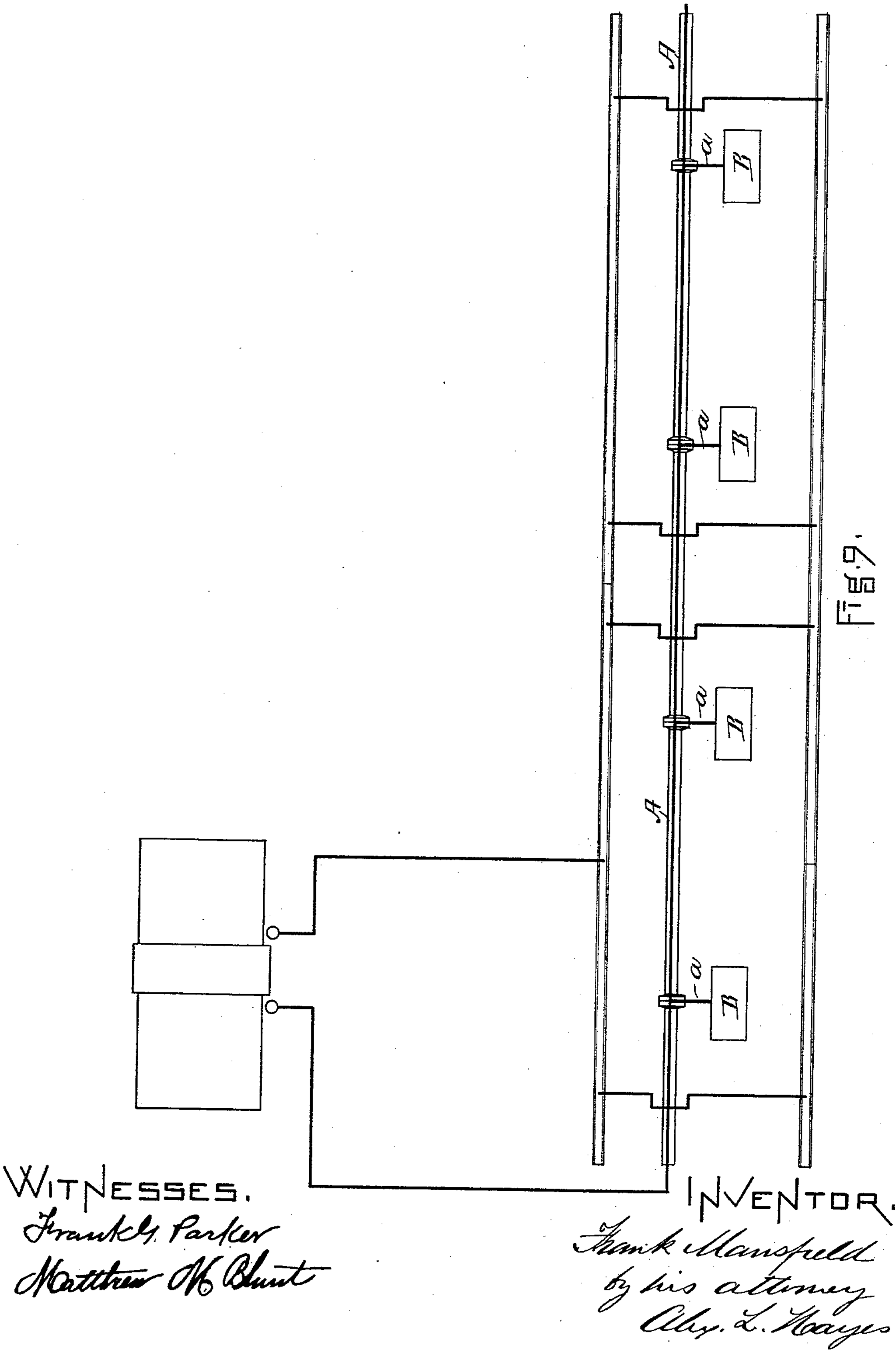

In the accompanying drawings, Figure 1 is a view in elevation, showing the car, the insulated conductor, the connecting devices, one of the conducting-strips of the series placed under the body of the car, and the electro-magnet on the car for operating the connecting device. Fig. 2 is a longitudinal view of the connecting device. Fig. 3 is a plan view of the same. Fig. 4 is a detail view in section of the circuit making and breaking device. Fig. 5 is a detail view of the electro-magnet on the car for operating the connecting device. Fig. 6 is a plan view of the conducting-strips. Fig. 7 is a perspective view of part of the case for the connecting device. Fig. 8 is a view of the end of the car containing the electro-magnet. Fig. 9 is a diagram of the circuit.

In the several figures the same letters refer to the same parts.

A is the electric conductor passing from the positive pole of the source of electricity, the return-current being carried back to the same source through the metallic body of the car and the rails or through a copper return-wire—one for each track—connected with each track and occasionally connected together. This conducting-wire is insulated in any suitable manner and is embedded in the ground. It is therefore perfectly secure from injury, and, moreover, a current of higher electro-motive force can be used upon it than can be used upon the uninsulated conductors generally used.

B B, Figs. 1 and 9, are the connecting devices. These are shown in detail in Figs. 2 and 3.

An insulated conductor *a* connects the main conductor with a part of the connecting device, so that when the same is in operation a circuit is established from this conductor to the motor or other device for utilizing electric energy upon the car. This connecting device is constructed as follows: C is a rectangular case of metal or other suitable material, which is inserted in the road-bed, so that the top of the case is flush with the surface of the same. D is a flat plate of metal, preferably about six inches in width, which is slightly less than the width of the case C and in length nearly as long as the same. This plate D is pivoted upon a shaft E, which extends across one end of the case near the top of the same. Upon the upper surface of this plate D is a piece of iron F, which forms the armature of the electro-magnet used to attract this plate. Upon the under side of this plate D is secured a removable closed case of metal G, inside of which is a lining of insulating material *c*, removable from the case, and within this case are two blocks H H′, of some suitable insulating material, separated from one another, but so inclined to each other that the distance between the blocks is smaller at the bottom of the case than at the top of the same. One of these blocks H fills one side of the case. The other H′ is inclined upon its inner face and does not extend to the top of the case. Upon the surface of each of these blocks, respectively, is secured a plate I I′, of metal, which is shorter than the inside face of the block. The plate I is electrically connected in any suitable manner to the wire *a*, which is connected to the main conductor, and the plate I′ is connected by an insulated wire *b* to a metallic block M on the under side of the end of the plate D and insulated from the same. In the space between the blocks H H′ is a series of metallic balls K, which, when the plate D returns to its normal position and before it has fallen into the case, are in the top of the box; but when the plate is tilted back into the position shown in Figs. 1 and 2 fall into the lower part of the said space and establish connection between the plates and consequently between the wires *a* and *b*.

Upon a shaft N, extending across the end of the case C opposite the end on which the shaft E is situated, is a sprocket-wheel O, which is connected to said shaft by a spiral spring P. A chain S is connected at one end to this sprocket-wheel and the other end is connected to the plate D. When the said plate is down, which is its normal position, the chain is wound up upon the wheel by the action of the spring; but when the plate D is tilted back it has a tendency to return to its normal position, owing to the action of the spring. Thus the block M is kept in firm contact with the conducting-strips underneath the car-truck. Any other form of spring than a spiral spring may be used.

L is a quadrant-shaped hood of thin metal, which is pivoted upon the same shaft as the plate D and in such relation thereto that when the plate is lifted this hood will be simultaneously drawn up; but when the hood has risen, as shown, it is prevented from moving farther by suitable stops *d*, and the plate D moves away from it. This hood acts as a shield to the case C, and prevents foreign bodies from falling into the case when it is opened by the further movement of the plate D. When the plate D returns to its normal position, it makes contact with the shield or hood L, and both return to the case together.

T are side pieces, which are attached to each side of the plate D, and are provided with extensions of thin metal T′. When the plate D returns to the case, these side pieces rest upon pedestals R in the bottom of the case and support the plate D. As before stated, the normal position of the plate D is flush with the surface of the road-bed, in which case the case C is completely closed and the connection between the wires *a* and *b* is broken.

It is intended that the plate D shall be lifted by mechanism attached to the car and that when lifted it shall connect the wires *a* and *b* and also make contact with a series of metallic strips *v* placed underneath a frame Y, attached to the trucks of the car and insulated from the frame. One of the terminals of the motor or other device for utilizing electrical energy on the car is electrically connected to these strips and the other terminal is connected to the metallic portion of the frame of the car, and thence through the wheels of the car and rails to the return-wire. This lifting of the plate D may be effected in several ways, either by the action of the electro-magnet or by a mechanical device upon the car. A convenient method is by the action of an electro-magnet, as hereinafter more fully set forth.

U is an electro-magnet which swings upon a suitable support under one end of the car and extends down to such a distance that when the poles of the magnet come over the iron block F on the upper surface of the plate E it will attract the same and adhere to it, and thus, as the car moves along, lift up that end of the plate D, as shown in Fig. 5. When it has been lifted up, the circuit through the magnet is broken, the conducting-strip on the under side of the frame Y comes into contact with the piece M on the under side of said plate, and, as said piece makes a rubbing contact with the strip T, a circuit is established from the insulated conductor A through the motor or other device for utilizing electrical energy upon the car.

The connecting devices B B are at such a distance from one another, according to the length of the car used, that before the car in its forward movement has ceased to be in connection with the plate D of one connecting device the electro-magnet on the car will come over the plate D of the next connecting device in the series. It in turn will be lifted and will make contact with the insulated strip $b$ before the preceding plate has ceased to be in contact. Thus the continuity of the current is preserved.

The current which magnetizes the electro-magnet U is derived from the main conductor A by means of the arrangement of a series of short insulated conducting-strips $v$ $v$, placed between the strips $b$ at each end of the car. One pole of the electro-magnet is connected to these short conducting-strips at the opposite end of the car and the other pole is connected to the metallic part of the car and thence to the return-wire. When the contact-piece M on the plate D comes into contact with these short conducting-strips, a part of the current flows into the electro-magnet U and magnetizes it, so that it is ready to attract the plate D when it comes over the said plate, as shown in Fig. 5.

The electro-magnet is detachable from the car so that it can be placed at either end of the same.

The manner of attaching the magnet is shown in Fig. 8, where one pole of the magnet is represented as connected to a metallic insulated clip $c$ on the car-frame, by means of which connection can be made with the conducting-strips $v$ $v$ under the body of the truck. These conducting-strips are shown in black.

For the purpose of preventing the plate D from being unable to swing completely back, owing to the formation of ice upon the case C, the top of the case C, as shown in Fig. 7, is provided with serrations $f$, which act to break up ice when the plate D swings back.

In order to insure a constant contact when the car is moving on a curve, I place a series of conducting-strips under the car, as shown in Fig. 6. These strips may progressively diminish in length from the central strip, as shown in Fig. 1. The plate D is of such length that the conducting-strips under the body of the car may be sufficiently far above the road-bed that any ordinary depth of water on the same will not interrupt the passage of the current.

I do not confine myself to the use of metallic balls within an inclosed place, as described, for completing the electrical connection with the wires $a$ and $b$ when the plate D is lifted, as other devices for accomplishing the same result may be used.

Upon a curve the connectors B B will not be on the middle of the track, but will be placed near one of the rails at a distance proportionate to the radius of the curve and the distance of the connectors apart.

The motor in the car is not shown, as it is not necessary to do so to illustrate the principle of my invention, which is applicable to any form of motor.

The invention can also be used for establishing a current through electric lamps placed in the car.

It will be observed that the conductor $b$ is not made alive until the plate D reaches its highest point, the circuit between $a$ and $b$ not being completed by the balls until the plate D reaches this position. In descending, the circuit between $a$ and $b$ is broken as soon as the plate D leaves this position, so that the exposed conducting end of the conductors is raised a considerable distance above the surface before it is made alive, the advantage of which is apparent and has been previously stated.

What I claim as my invention, and desire to secure by Letters Patent of the United States, is—

1. The combination, in an electrical railway, of a subterranean conductor insulated throughout its length, branch conductors suitably insulated throughout and extending from the main at intervals along the way, the circuit of which is normally broken, a series of movable members arranged along the way, to which said branch conductors are connected, circuit-completing means for said branch conductors controlled by said movable members, an electro-magnet carried by a car, and circuit-completing devices on said car with which the branch conductors make contact when the movable members are raised by said electro-magnet.

2. The combination, in an electrical railway, of a subterranean conductor insulated at all points throughout its length, branch conductors extending therefrom at intervals along the way, pivoted plates at said branch conductors normally flush with the surface of the way, circuit making and breaking devices for said branch conductors, operated by said pivoted plates, a contact-plate underneath the car, and an electro-magnet arranged upon said car to raise said pivoted plates in contact with the aforementioned plate carried by the car.

3. The combination, in an electrical railway, of a conductor insulated at all points throughout its length, with normally disconnected branch conductors extending therefrom at intervals along the way, a pivoted plate carrying circuit making and breaking devices for said branch conductors, consisting of a case having conducting-plates therein, the said case being carried by said pivoted plates, conducting-balls arranged in said case controlled by gravity, and a pick-up carried by a car for raising said plates, for the purpose described.

4. The combination, in an electrical railway, of a subterranean conductor insulated at all points throughout its length, branch conductors $a b$, normally disconnected, extending therefrom and insulated throughout, boxes, as C, at said branch conductors, pivoted plates D, carried by said boxes, controlling circuit making and breaking devices for said branch conductors $a$ $b$, and a spring-actuated sprocket wheel and chain connected with said pivoted plates, all adapted to be operated substantially as and for the purpose described.

5. The combination of the boxes C, arranged at intervals along the way to house branch conductors extending from a subterranean conductor insulated throughout, the plate D, pivoted thereto, carrying circuit-completing connections and adapted to be raised and place said branch conductors in contact with circuit-completing devices on a car, and a hood L, connected with said plate, substantially as and for the purpose described.

6. The combination, in an electrical railway, of the plate D, pivoted to a box arranged flush with the surface of the ground at intervals along the way, for the purpose described, and the edges $f$ in the top edge of said boxes near the pivot of the hinge, as and for the purpose described.

7. The combination of the box C, the pivoted plate D, conductors $a$ and $b$, carried thereby, a circuit maker and breaker between said conductors arranged to complete the circuit between the same, spring-actuating devices for drawing said plate to its normal position, side pieces T, attached to said plate, and pedestals for the same, substantially as described.

8. As a means for controlling the circuit to a raised contact—such, for instance as a contact-plate carried by a car at a considerable distance above the surface of the way—of an electrical railroad, a pivoted plate D, circuit-terminals and a case carried thereby, having conducting-balls controlled by gravity controlling said circuit-terminals, and a contact device carried by said plate adapted to be put in communication with the aforesaid contact when said plate is raised, substantially as described.

9. The combination, in an electrical railway, of a frame carried beneath a car, a contact-plate mounted upon said frame, a subterranean conductor insulated throughout, normally-disconnected branch conductors extending therefrom at intervals along the way, insulated throughout, but having exposed ends, a series of movable members arranged along the way, connected with said branch conductors, circuit-completing means for said normally-disconnected branch conductors controlled by said movable members, and an electro-magnet carried by said frame, for the purpose described.

10. The combination of the electro-magnet U, arranged underneath a car, the conducting-strips $v$ $v$, arranged at each end thereof, a conductor adapted to be raised by said electro-magnet and placed in communication with circuit-completing devices on said car and in the path of said strips, circuits leading from said strips to said electro-magnet, as described, whereby said conductor and strips may be utilized to make and break circuit of said magnet as the car progresses to raise and release the successive conductors for a portion of the time said conductor is elevated, substantially as described.

11. The combination, in an electric railway, of a pivoted detachable magnet, as U, arranged underneath a car, pivoted plates arranged at intervals along the way bearing conductors adapted to be successively placed in contact with circuit-completing devices on said car, and circuit-completing means, as $c$, between the removable magnet-support and its circuit, substantially as described.

12. The combination, in an electrical railway, of a movable magnet attached to a car, contact devices carried by said car, pivoted plates having an electrical terminal arranged at intervals along the way adapted to be raised in the path of said contact devices by the aforesaid movably-attached magnet.

13. The combination, in an electrical railway, of a contact-plate carried by a car, a subterranean conductor insulated throughout at all points, insulated branch conductors extending therefrom at intervals along the way, the intervals being less than the length of the aforesaid contact-plate, conducting-strips carried at each end of said car only, circuits emanating therefrom in which an electro-magnet may be placed, which magnet is adapted to raise said branch conductors in the path of said conducting-strips and contact-plate, whereby the circuit of said electro-magnet will be completed but a short interval of time during the passage of the car and the circuit to the car be completed at all times, substantially as described.

14. An electric railway having a subterranean main conductor insulated throughout its length, movable branch conductors extending from the main conductor at intervals along the way and normally disconnected therefrom, said movable branch conductors adapted to be moved by mechanism on a traveling car and raised thereby a considerable distance above the level of the road-bed and make contact with devices on the car at an elevation above surface-water, whereby contact may be made between the branch conductors and the devices on the car at a great distance above the road-bed, for the purpose set forth.

15. An electric railway having a subterranean main conductor insulated throughout its length, movable branch conductors extending from the main conductor at intervals along the way and suitably insulated throughout, the said branch conductors normally disconnected from the main conductor and normally disposed at or about the level of the road-bed and adapted to be raised a considerable distance above the level of the road-bed by mechanism on the car and placed in contact with devices thereon, the raising of the branch conductors into elevated contact with the devices on the car acting to automatically place them in electric connection with the main, whereby the branch conductors remain disconnected from the main and therefore inert until elevated into contact with the contact devices on the car.

FRANK MANSFIELD.

Witnesses:
ALEX. L. HAYES,
HENRY LUNT.